United States Patent
Tachi

(10) Patent No.: US 9,175,785 B2
(45) Date of Patent: Nov. 3, 2015

(54) PLUG FOR USE IN A BEVERAGE CONTAINER

(71) Applicants: Thermos K.K., Tsubame-shi, Niigata-ken (JP); Thermos L.L.C., Schaumburg, IL (US)

(72) Inventor: Katsuaki Tachi, Tsubame (JP)

(73) Assignees: THERMOS KK (JP); THERMOS L.L.C., Schaumburg, IL (US)

( * ) Notice: Subject to any disclaimer, the term of this patent is extended or adjusted under 35 U.S.C. 154(b) by 0 days.

(21) Appl. No.: 13/907,288

(22) Filed: May 31, 2013

(65) Prior Publication Data

US 2013/0320251 A1 Dec. 5, 2013

(30) Foreign Application Priority Data

Jun. 4, 2012 (JP) .................. 2012-127507

(51) Int. Cl.
  *F16K 31/52* (2006.01)
  *A47J 41/00* (2006.01)
(52) U.S. Cl.
  CPC ............. *F16K 31/52* (2013.01); *A47J 41/0027* (2013.01)
(58) Field of Classification Search
  CPC .................................... A47J 41/0022
  USPC ......... 222/131, 556; 251/101, 83, 82
  See application file for complete search history.

(56) References Cited

U.S. PATENT DOCUMENTS

| 4,116,366 | A | * | 9/1978 | Takenakashima et al. ... 222/131 |
| 4,300,705 | A | * | 11/1981 | Shy ............................... 222/131 |
| 4,648,535 | A | * | 3/1987 | Zimmermann ............... 222/472 |
| 4,676,411 | A | * | 6/1987 | Simasaki ....................... 222/517 |
| 5,037,015 | A | * | 8/1991 | Collins .......................... 222/472 |
| 5,240,145 | A | * | 8/1993 | Hogberg ........................ 222/131 |
| 6,269,984 | B1 | * | 8/2001 | Murakami ..................... 222/472 |

(Continued)

FOREIGN PATENT DOCUMENTS

| EP | 1230882 | 8/2002 |
| JP | 2002-165709 | 6/2002 |

(Continued)

OTHER PUBLICATIONS

Communication regarding the Extended European Search Report dated Oct. 17, 2013, 6 pages.
English language translation of the Abstract of Japanese Patent Application Publication No. 2007-135891 (Japanese Application No. JP 2005-334297, now issued as Japanese Patent No. JP 4514692 as listed above).

*Primary Examiner* — John K Fristoe, Jr.
*Assistant Examiner* — Christopher Ballman
(74) *Attorney, Agent, or Firm* — Polsinelli PC

(57) ABSTRACT

A plug includes: a fluid passage in a main body; a valve body biased to close an inlet of the fluid passage; a cover disposed on an upper end of the main body and closing an upper opening section thereof; and a control lever of the cover that can be pushed downward to open and close the valve body. An engagement claw section is formed on an elastic section of the main body. Provided on the cover is a transverse-plate upper surface for engaging the engagement claw section. A protrusion section of the control lever abuts against and shifts the elastic section in a disengagement direction when pushing the control lever downward. The protrusion section can thus disengage the engagement claw section from the transverse-plate upper surface. The control lever biased upward by the valve body allows the cover to be easily and lightly disassembled from the main body.

18 Claims, 14 Drawing Sheets

(56) References Cited

U.S. PATENT DOCUMENTS 6,648,183 B2 * 11/2003 Nybakke ............... 222/472
2002/0063141 A1 * 5/2002 Hirose et al. ........... 222/131

FOREIGN PATENT DOCUMENTS

JP      2007135891      6/2007
JP      4514692      5/2010

OTHER PUBLICATIONS

English language translation of the Abstract of Japanese Patent Application Publication No. 2002-165709 (Japanese Application No. JP 2000-364901).

Korean Patent Application No. 10-2013-0063687 Notice of Preliminary Rejection (with translation) dated Oct. 29, 2014 (12 pages).

* cited by examiner

PLUG FOR USE IN A BEVERAGE CONTAINER

BACKGROUND OF THE INVENTION

1. Field of the Invention

The present invention relates to a plug for use in a beverage container such as a thermos bottle. Particularly, the present invention relates to a plug having a valve structure, and allowing a content fluid to be poured out when attached to a beverage container.

2. Description of Related Art

Conventionally, as a plug of such kind, there has been disclosed an inner plug structure (e.g., Japanese Patent No. 4514692) for use in a fluid container. This inner plug structure includes: an inner plug main body detachably attached to an opening section of a container main body; a fluid passage that is formed inside the inner plug main body, and connects an inlet and an outlet that are respectively opened toward an inner side and an outer side of the container main body; a valve body biased in a direction allowing the inlet of the fluid passage to be closed; a cover that is disposed on an upper end of the inner plug main body and serves to close an upper opening section thereof; and a control switch that is provided on the cover and is capable of being slid back and forth such that the valve body can be opened and closed. Further, while a first engagement portion is provided on either one of the inner plug main body and the cover, a first engageable portion engageable with the first engagement portion is provided on the other. Here, an elastic section is provided on the upper end of the inner plug main body. Particularly, while a second engagement portion is provided on either one of the elastic section of the inner plug main body and the cover, a second engageable portion engageable with, the second engagement portion is provided, on the other. This inner plug structure is simpler than a conventional structure where coupling portions are provided on whole circumferences of the inner plug main body and the cover. Moreover, since a force used to slide the control switch is applied in a horizontal direction, i.e., a direction other than a disengagement direction, the inner plug structure shall not be disassembled involuntarily.

SUMMARY OF THE INVENTION

As for a conventional disassemblable inner plug structure for use in a fluid, container, an unstable interlocking force has been observed between an inner ping main body and a cover, thus resulting in a problem where the cover may be involuntarily removed at the time of manipulating a lever to perform opening and closing, and the inner plug structure may thus be involuntarily disassembled at that time. As a solution to such problem, the aforementioned inner plug structure is the structure in which: while the first engagement portion is provided on either one of the inner plug main body and the cover, the first engageable portion is provided on the other; the elastic section is provided on the upper end of the inner plug main body; and while the second engagement portion is provided on either one of the elastic section of the inner plug main body and the cover, the second engageable portion is provided on the other.

However, when toppled inadvertently, the aforementioned inner plug structure employing a sliding lever may cause a fluid in the container to flow out and contaminate a surrounding area. Further, when disassembling the inner plug structure, it is required that the cover be removed while pushing an elastic member with one hand, thus resulting in a shortcoming of making a disassembly procedure troublesome.

Further, as for a structure without an elastic member such as the type of elastic member described above, a cover may not be removed easily or properly due to a tightness or looseness thereof resulting from rigidities or sizes of the cover and a plug main body. In other words, troublesome adjustments are required in such case.

The present invention has been made to solve the aforementioned problems. That is, it is an object of the present invention to provide a plug of a beverage container that, can be disassembled with a small, force, but shall not be disassembled due to an erroneous usage at the point of general use.

A first aspect of the present invention, is to provide a plug for use in a beverage container having a container main body. This plug includes: a plug main body detachably attached to an opening section of the container main body; a fluid passage formed, inside the plug main body, and extending from an inlet open toward an inner side of the container main body to an outlet open toward an outer side of the plug main body; a valve body biased in a direction allowing the inlet of the fluid passage to be closed; a cover that is provided on an upper end of the plug main body and serves to cover an upper opening section of the plug main body; a control lever that is provided on the cover and is capable of being pushed downward such that the valve body can be opened and closed; a first engagement portion provided on one of the plug main body and the cover; a first engage-able portion that is provided on the other of the plug main body and the cover and is engageable with the first engagement portion; an elastic section provided on an upper portion of the plug main body; a second engagement portion provided on one of the elastic section, of the plug main body and the cover; a second engageable portion that is provided on the other of the elastic section of the plug main body and the cover and is engageable with the second engagement portion; and a protrusion section that is provided on the control lever, and is capable of abutting against and moving the elastic section in a disengagement direction when pushing the control lever downward.

According to a plug of a beverage container as forth in a second aspect of the present invention, while the control lever serves to open and close the valve body when pushed downward with the plug main body being attached to the container main body, the protrusion section is allowed to stop short of disengaging the elastic section as a control portion of the control lever abuts against a shoulder member provided on the beverage container.

According to a plug of a beverage container as forth in a third aspect of the present invention, the elastic section is arranged on an inner side of an outermost diameter of the plug main body such that the protrusion section can enter an inner side of the cover when pushing the control lever downward.

According to the invention, of the first aspect, pushing the control lever downward causes the protrusion section thereof to shift the elastic section of the plug main body in the disengagement direction, thereby allowing the second engagement portion and the second engageable portion to disengage from each other. At that time, since the control lever is biased upward due to the valve body, the cover can be easily removed from the plug main body.

According to the invention of the second aspect, the valve body can be opened by pushing the control lever at an initial position downward through the control portion. In contrast, by releasing the control lever, the valve body that has been biased upward shall cause the control lever to return to its initial position such that the valve body can be closed. In addition, the control portion shall, abut against the shoulder member even when pushing the control lever downward with the plug main body being attached to the container main body, thus preventing the second engagement portion and the second engageable portion from disengaging from each other.

According to the invention of the third aspect, the protrusion section can enter the inner side of the cover when pushing the control lever downward, thus improving an outer appearance as well as a design property. Therefore, a contact with the protrusion section can be avoided to a certain, extent, thus improving a safety.

DETAILED DESCRIPTION OF THE INVENTION

Figure 1:
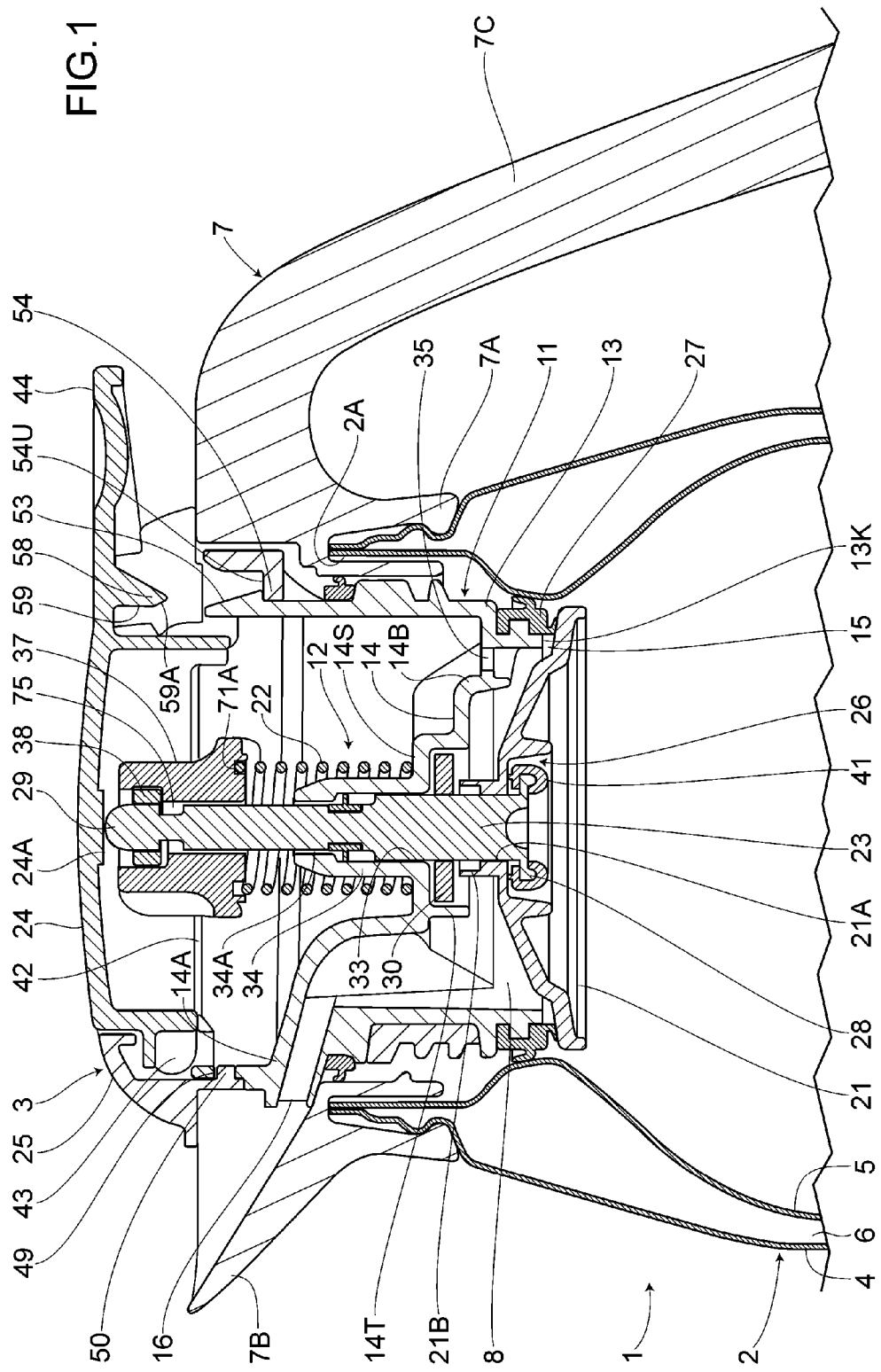
FIG. 1 is an overall cross-sectional view showing a first embodiment of the present invention.

A preferred embodiment of the present invention is described in detail hereunder with reference to the accompanying drawings. However, the embodiment described hereunder shall not limit the contents of the present invention that are described in the scope of claims. Further, not alt the elements described hereunder are essential elements of the present invention. In fact, an unconventional plug is used in the following embodiment, and the following description is thereby made on the corresponding plug.

First Embodiment

FIG. 1 through FIG. 23 show a first embodiment of the present invention. A beverage container 1 which is a thermos bottle, includes: a container main body 2; and a plug 3 that can be detachably attached to an upper opening section 2A of the container main body 2. The container main, body 2 includes: an inner container 5; an outer container 4; and a heat-insulating layer 6 provided between such inner container 5 and outer container 4. Particularly, each of the inner container 5 and the outer container 4 is made of stainless steel and has an opened upper portion. More particularly, upper ends of the inner container 5 and the outer container 4 are integrally joined to each other with a shoulder member 7 being further integrally disposed on an upper portion formed by such inner container 5 and outer container 4. Here, the shoulder member 7 is made of a synthetic resin and is vertically disposed on an opened section formed by the inner container 5 and the outer container 4 that are joined to each other. The shoulder member 7 includes: an annular engagement portion 7A engageable with the aforementioned opened section; a beaked spout portion 7B protruding from one side of the annular engagement portion 7A; and a grip 7C protruding from a location that is opposite to where the spout portion 7B is provided. The aforementioned ping 3 that is also made of a synthetic resin can be detachably attached, to the annular engagement portion. 7A.

The plug 3 includes: a fluid passage 8 allowing a content fluid to be poured through the spout portion 7B when tilting the beverage container 1 toward a direction along which the spout portion 7B is provided; aping main body 11 that can be screwed to the shoulder member 7; and a valve structure 12 capable of opening and sealing the fluid passage 8.

The plug main body 11 includes a cylindrical body 13 that can be screwed to the shoulder member 7. Further, provided inside the cylindrical body 13 is a wall-shaped inner divider 14 whose height is formed lower from one side to the other. Here, the aforementioned fluid passage 8 is formed below and along the inner divider 14. The fluid passage 8 is so formed that it continuously connects an inlet 15 serving as a lower opening section of the cylindrical body 13 to an outlet 16 opened on an upper section of the other side. The inner divider 14 includes: a second-side region 14B connected to where the inlet 15 is formed; and a first-side region 14A connected to an upper side surface of die cylindrical body 13. Particularly, the outlet 16 is formed below where the first-side region 14A is connected to the upper side surface of the cylindrical body 13.

Further, the plug 3 includes: an elastic member 22 such as a coil spring for constantly lifting a valve body 21 of the valve structure 12 upward such that the inlet 15 can be sealed by the valve body 21; a control lever 24 for pushing a valve pole 23 of the valve body 21 downward; and a cover 25 covering an upper portion of the plug main body 11. The valve body 21 serves to seal a lower end portion 13K of the cylindrical body 13 in a watertight manner, thus allowing the inlet 15 to be sealed.

The aforementioned valve structure 12 includes: the valve body 21; the valve pole 23 extended upward from a central region of the valve body 21; and a pressure reducing unit 26 formed between the valve pole 23 and the valve body 21. The valve body 21 is formed into the shape of a disk having a diameter slightly larger than that of the lower end portion 13K. Particularly; the valve body 21 serves to seal the inlet 15 by abutting against a water-stop packing 27 attached to the lower end portion 13K. Further, bored in the central region of the valve body 21 is an attachment hole 21A used to attach the valve pole 23.

The valve pole 23 integrally includes: a disk portion 28 that is formed on a lower end thereof and has a diameter larger than that of the attachment hole 21A; and a shaft portion 29 extended upward. Further, an engagement plate 30 is detachably attached to a lower region of the shaft portion 29, the engagement plate 30 being made of a synthetic resin and serving as an engagement member.

Figure 11A:
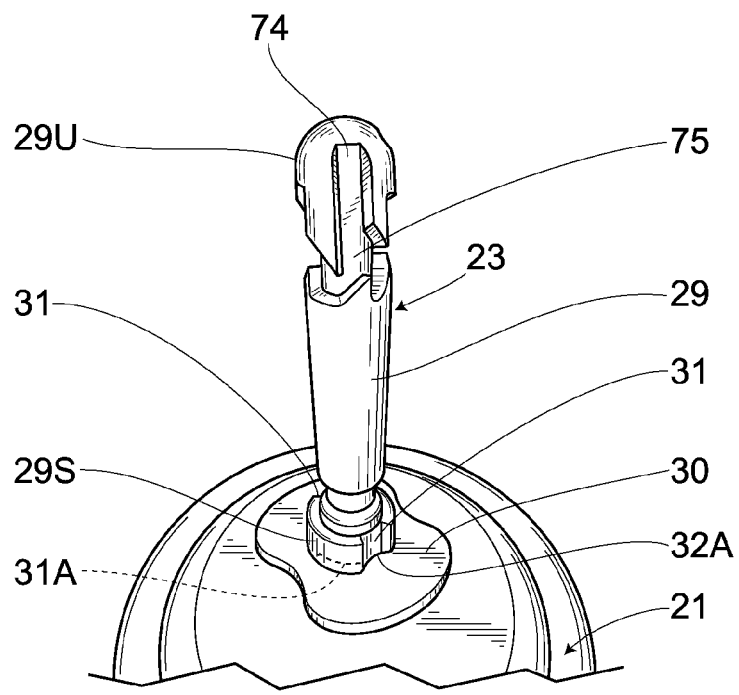
FIG. 11A is a perspective view showing a state of a valve body of the first embodiment in which engageable sections of an engagement plate are positioned to vertical grooves of a valve pole.
Figure 11B:
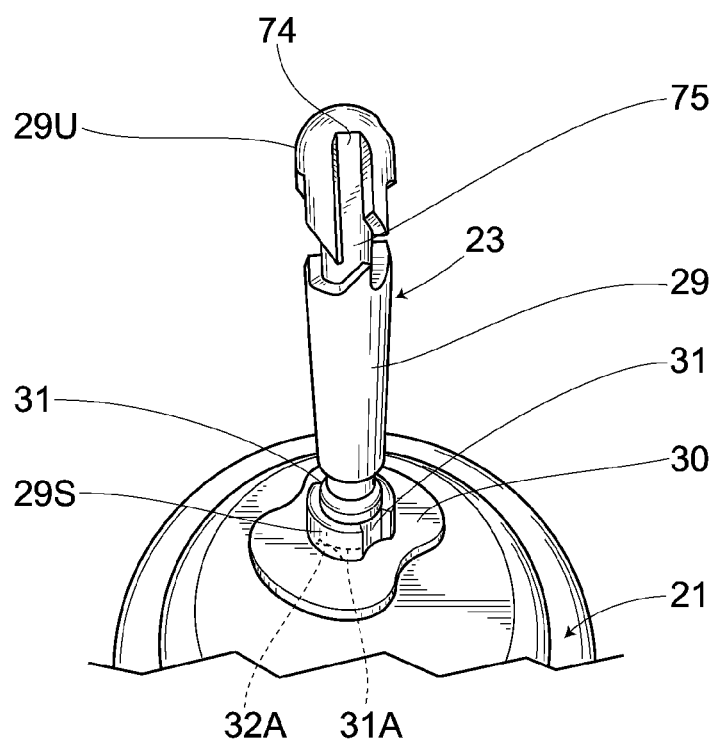
FIG. 11B is a perspective view showing a state of the valve body of the first embodiment in which the engagement plate has been positioned in an axial direction after being rotated by about 90 degrees.

Particularly, a lower section 29S of the shaft portion 29 has a diameter larger than that of an upper section 29U of the shall portion 29. Further, provided on an outer circumference of the lower section 29$ are vertical grooves 31, 31 that are positioned opposite to each other. These vertical grooves 31, 31 are formed in an axial direction, and a distance between bottom sections of these vertical grooves 31, 31 substantially corresponds to the diameter of the upper section 29U. Meanwhile, the aforementioned engagement, plate 30 is substantially formed into an oval shape and has a through hole 32 formed in a center thereof. This through hole 32 has engageable sections 32A, 32A capable of engaging with the vertical grooves 31, 31, thus allowing the lower section 29S to be inserted through the through hole 32. Further, engagement grooves 31A, 31A are circumferentially provided next to the vertical grooves 31, 31 in a manner such that each engagement groove 31A is formed at an angle of about 90 degrees with respect to adjacent vertical grooves 31, 31. As shown in FIG. 11A, the engagement plate 30 is to be disposed on the lower section 29S of the shaft portion 29 by engaging the engageable sections 32A, 32A with the vertical grooves 31, 31. Next, the engagement plate 30 thus disposed is to be rotated by about 90 degrees in a planar view. Here, as shown in FIG. 11B, each engageable section 32A can thereby engage with each engagement groove 31A, thus allowing the engagement plate 30 to be attached to the valve pole 23 with the engagement plate 30 itself being positioned in a longitudinal direction of the shaft portion 29. The engagement plate 30 thus attached can likewise be removed through a reverse procedure.

Figure 12:
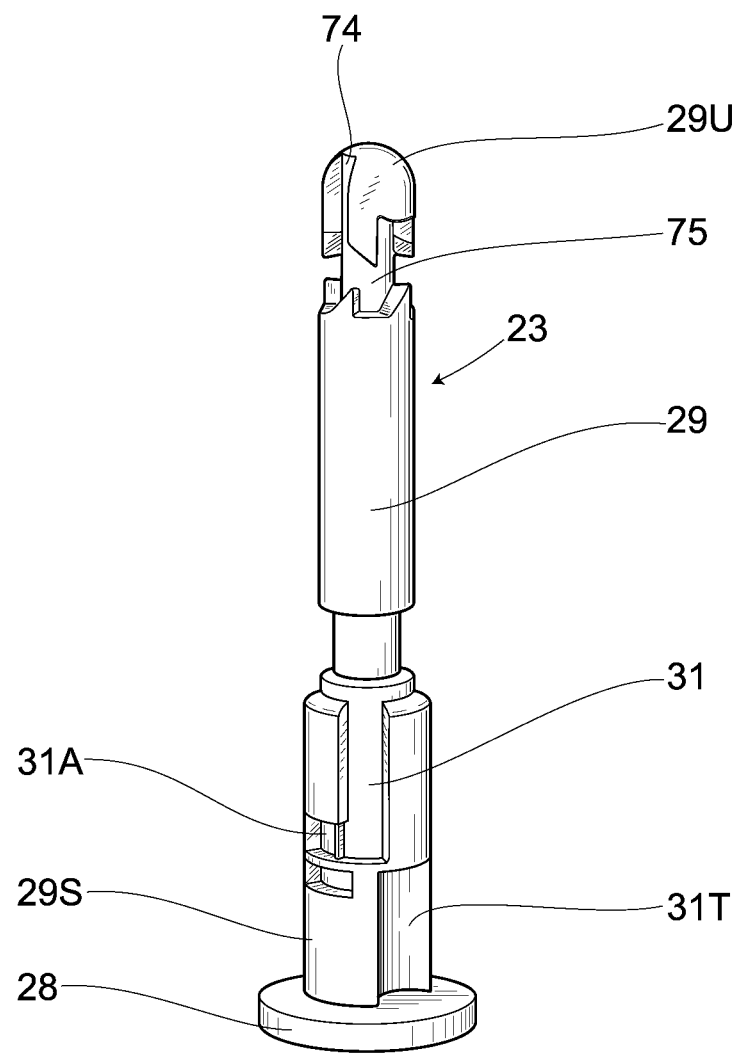
FIG. 12 is a perspective view showing the valve pole of the first embodiment.
Figure 13:
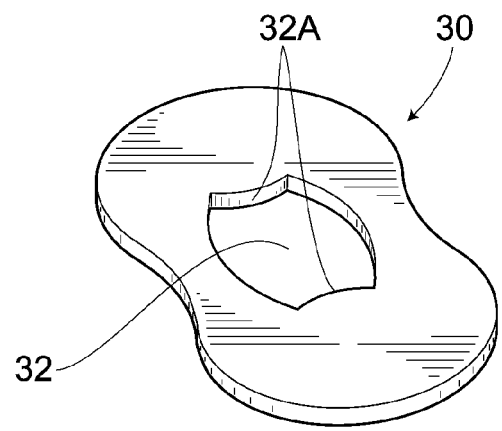
FIG. 13 is a perspective view showing the engagement plate of the first embodiment.
Figure 14:
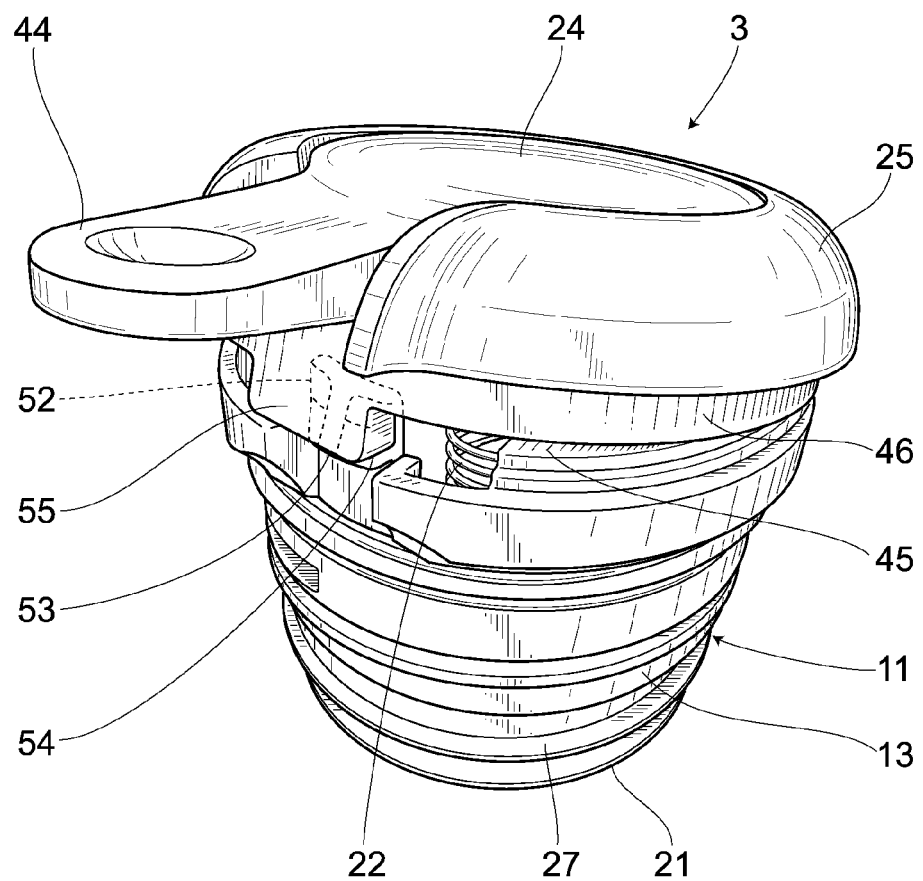
FIG. 14 is a perspective view showing a state of the plug of the first embodiment in which the second engagement portion and the second engageable portion have been disengaged from each other.
Figure 15:
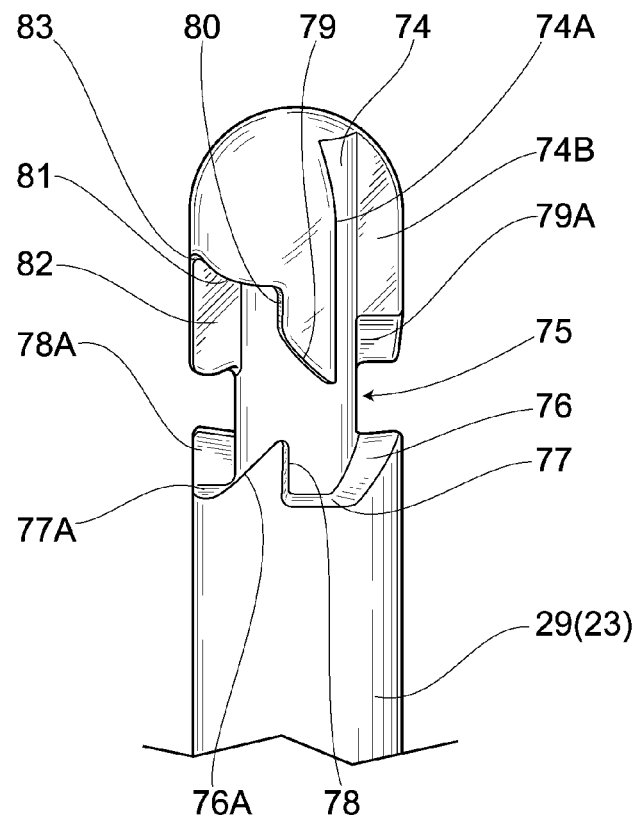
FIG. 15 is a perspective view showing an upper end side of the valve pole of the first embodiment.
Figure 16:
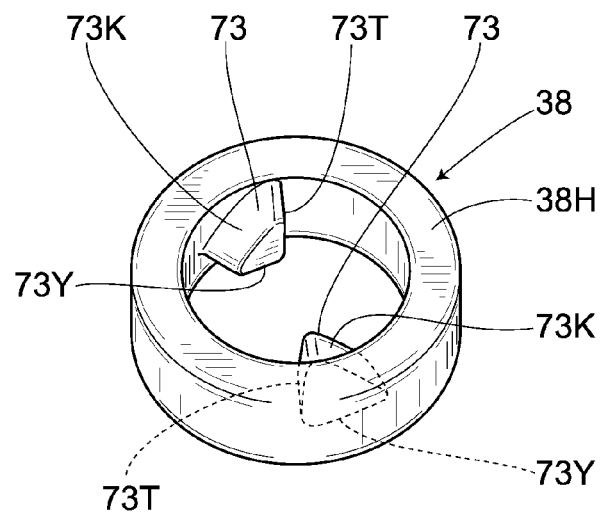
FIG. 16 is a perspective view showing a rotatable part of the first embodiment.

Further, as shown in FIG. 12, also provided on the lower section 29S of the shaft portion 29 are ventilation grooves 31T, 31T. Particularly, these ventilation grooves 31T, 31T are formed on an outer circumferential section of the lower section 29S that is below the engagement grooves 31A, 31A. More particularly; these ventilation grooves 31T, 31T are vertical and are provided opposite to each other. The lower section 29S having such ventilation grooves 31T, 31T is to be inserted through the aforementioned attachment hole 21A.

As for the aforementioned inner divider 14, formed on a central portion 14S thereof is a through hole 33 allowing the shaft portion 29 of the valve pole 23 to be inserted therethrough. Further, provided on an upper circumference of such through hole 33 is a guiding cylinder 34 that is intended for the shaft portion 29. Furthermore, the inner divider 14 includes an air hole 35 that is formed on the other side, i.e., opposite to the outlet 16 in a radial direction.

The aforementioned elastic member 22 is fitted onto the guiding cylinder 34. This elastic member 22 is compressed between: an upper surface of the central portion 14S of the inner divider 14; and a valve body cover 37 that is detachably provided on an upper portion of the valve pole 23 protruding from the guiding cylinder 34. The elastic member 22 serves to constantly lift the valve body 21 upward.

The valve body cover 37 serves to hold an tipper portion of the elastic member 22. Particularly, the valve body cover 37 includes a rotatable part 38 that can, in a vertical direction, be detachably connected to the upper section of the shaft portion 29 of the valve pole 23. This rotatable part 38 is rotatably fitted inside the valve body cover 37 and can be detachably attached to the upper portion of the valve pole 23.

The engagement plate 30 rises and fails along with the valve pole 23. Further, an undersurface of the engagement plate 30 is allowed to abut against an upper end of a cylindrical receiving portion 21B protruding upward from the attachment hole 21A. Furthermore, provided on an undersurface of the central portion 14S is a cylindrical portion 14T protruding therefrom, the cylindrical portion 14T being capable of receiving the engagement plate 30.

Here, a pressure reducing packing 41 is attached to an outer circumference of the aforementioned disk portion 28.

The shaft portion 29 of the valve pole 23 is to be inserted through the attachment hole 21A, and the elastic member 22 is compressed between the valve body cover 37 and the upper surface of the central portion 14S. Therefore, an undersurface of the valve body 21 and the pressure reducing packing 41 can tightly abut against each other, thus allowing the valve pole 23 and the valve body 21 to be connected to each other as a whole. In fact, the aforementioned a pressure reducing unit 26 includes: the attachment hole 21A of the valve body 21; the disk portion 28 of the valve pole 23; the pressure reducing packing 41; the elastic member 22; and the engagement plate 30.

The attachment hole 21A of the valve body 21 has a diameter larger than that of the shaft portion 29 of the valve pole 23. Here, the valve structure 12 is to be installed in the plug main body 11 as follows. That is, the upper section 29U of the shaft portion 29 protruding upward from the valve body 21, is to be inserted through the guiding cylinder 34 along a small-diameter inner circumferential surface 34A that is located on an upper portion of the guiding cylinder 34. Next, the engagement plate 30 is to be received in the cylindrical portion 14T, and the valve body cover 37 is to be engaged with the upper section 29U of the shaft portion 29 with the elastic member 22 being fitted onto the guiding cylinder 34.

Figure 3:
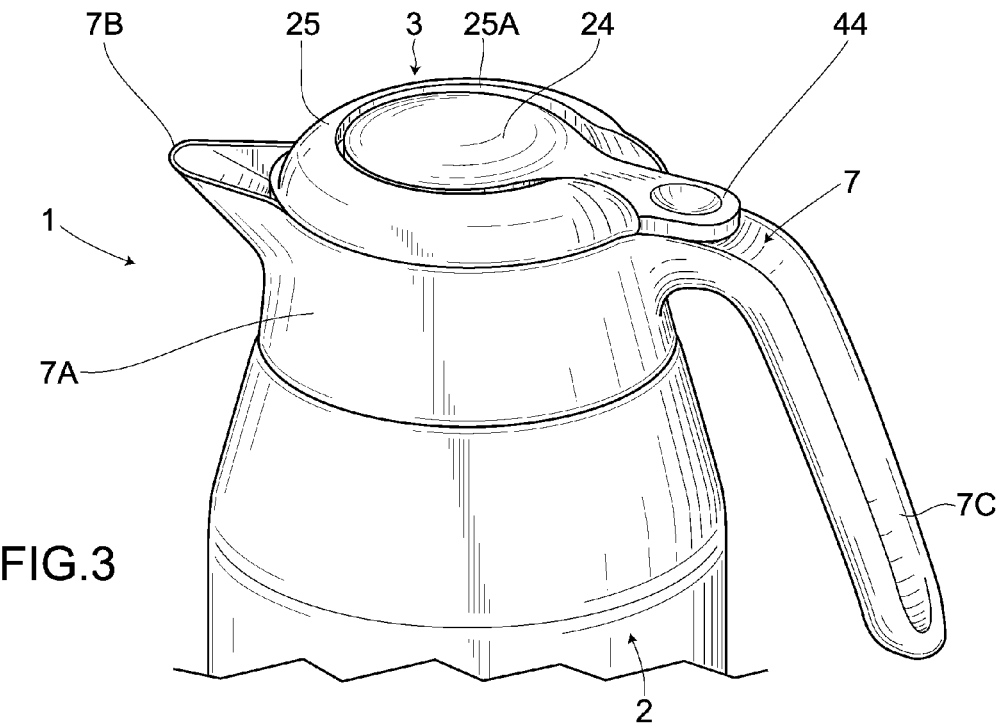
FIG. 3 is a perspective view showing a beverage container of the first embodiment.

The aforementioned cover 25 serves to cover an upper opening section 42 of the cylindrical body 13 of the plug main body 11. Particularly, the cover 25 is detachably provided on the upper opening section 42 in a manner such that the cover 25 is actually engageable with the cylindrical body 13. As shown in FIG. 3, provided on a central region of the cover 25 is an opening section 25A formed as a cutout. As for such cutout, opened is a portion of the cover 25 that is arranged on the other side of the shoulder member 7. Further, disposed on the opening section 25A is the aforementioned control lever 24 whose one end is pivotally attached to the cover 25 through a pivot point 43 such that the control lever 24 can be titled with respect to the cover 25. Here, a control portion. 44 of the control lever 24 protrudes outward from the other side of the cover 25 and is thus positioned above the shoulder member 7. Moreover, a convex portion 24A is provided on a region of an undersurface of the control lever 24 that allows an upper end of the valve pole 23 to abut there against, the convex portion 24A having a flat undersurface.

Figure 5:
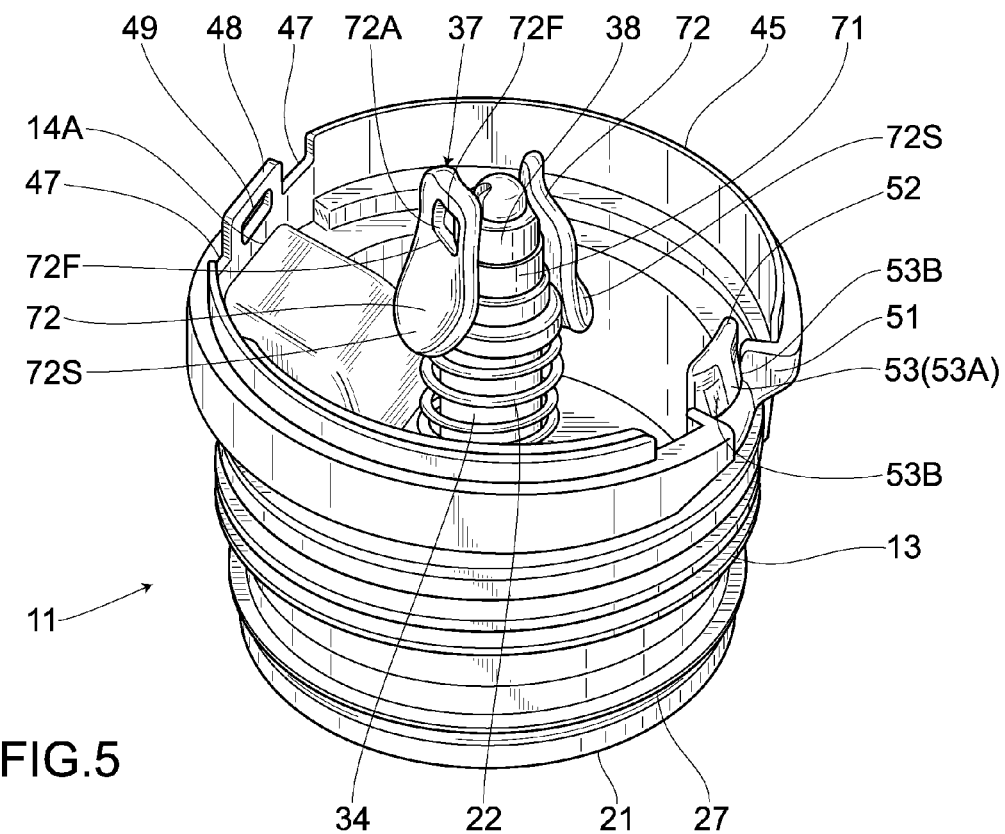
FIG. 5 is a first perspective view showing a plug main body of the first embodiment.

As for the upper portion of the plug main body 11 shown in FIG. 5, for example, an upper cylindrical portion 45 is provided on an upper portion of the cylindrical body 13. Further, as shown in FIG. 6, for example, formed on an undersurface of the cover 25 is a lower cylindrical portion 46 that is to be fitted onto the upper cylindrical portion 45.

Figure 9:
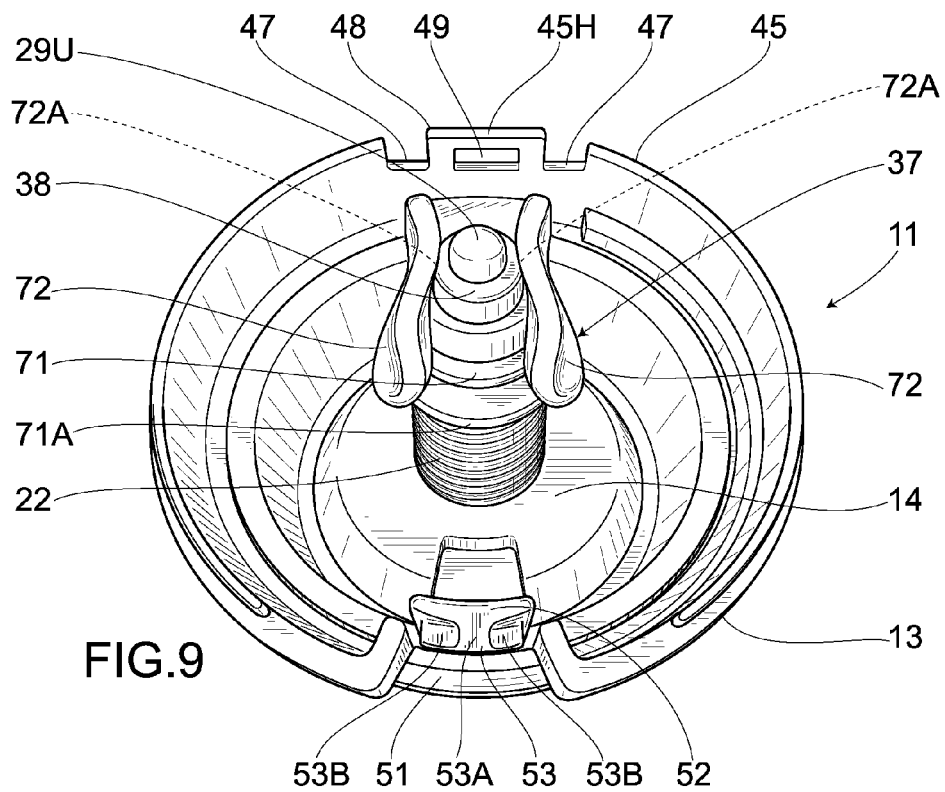
FIG. 9 is a second perspective view showing the plug main body of the first embodiment.
Figure 10:
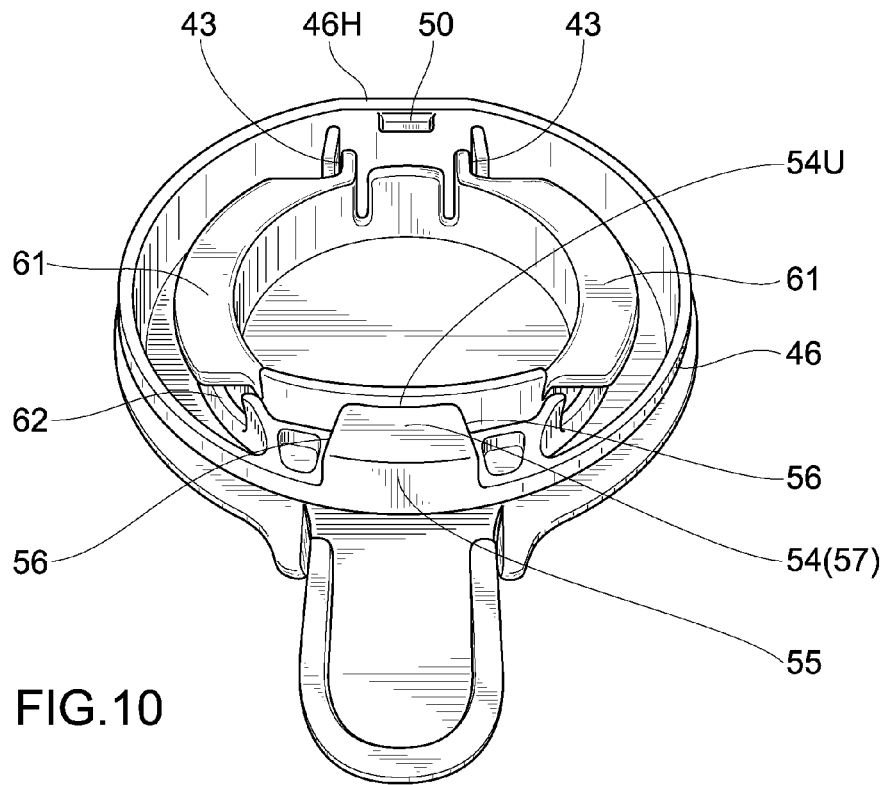
FIG. 10 is a second perspective view showing the control lever of the first embodiment.

As shown in FIG. 5 and FIG. 9, a horizontal planar section 45H is provided on one side of the upper cylindrical portion 45. Further, cutout grooves 47, 47 whose upper portions are opened are respectively and symmetrically formed on a left and right sides of the planar section 45. Here, provided between the cutout grooves 47, 47 is a protrusion section 48 having a transverse hole 49 as a first engagement portion bored therein. As shown in FIG. 6 and FIG. 10, a horizontal planar section 46H is provided on one side of the lower cylindrical portion 46. Particularly, formed on an inner surface of the planar section 46H is a transverse protruding portion 50 as a first engageable portion that, is engageable with the transverse hole 49. In this case, the transverse hole 49 is formed on the protrusion section 48 having only a lower portion thereof fixed to the cylindrical body 13, thereby allowing the protruding portion 50 to engage with the transverse hole 49 in a stepwise manner.

Meanwhile, as shown in FIG. 5 and FIG. 9, provided on an upper portion of the other side of the cylindrical body 13 is a concave area 51 that is recessed toward an inner side of the cylindrical body 13. An elastic section 52 protruding upward is formed on a bottom section of the concave area 51. In fact, this elastic section 52 is connected to the cylindrical body 13 only through a lower end thereof, and an upper end of such elastic section 52 is formed as a free end. Further, formed on an outer surface of the elastic section 52 is an engagement claw section 53 serving as a second engagement portion. This engagement claw section 53 includes: a horizontal engagement surface 53M; a central slanted surface 53A extending from a center of the engagement surface 53M to the upper end of the elastic section 52; and side slanted surfaces 53B, 53B that are formed, on both sides of and lower than the central slanted surface 53A. That is, the concave area 51 that is recessed inward is provided on the cylindrical body 13, and the elastic section 52 is further disposed inside the concave area 51. Therefore, the elastic section 52 is allowed to be arranged inside an outer diameter of the plug main body 11.

Figure 6:
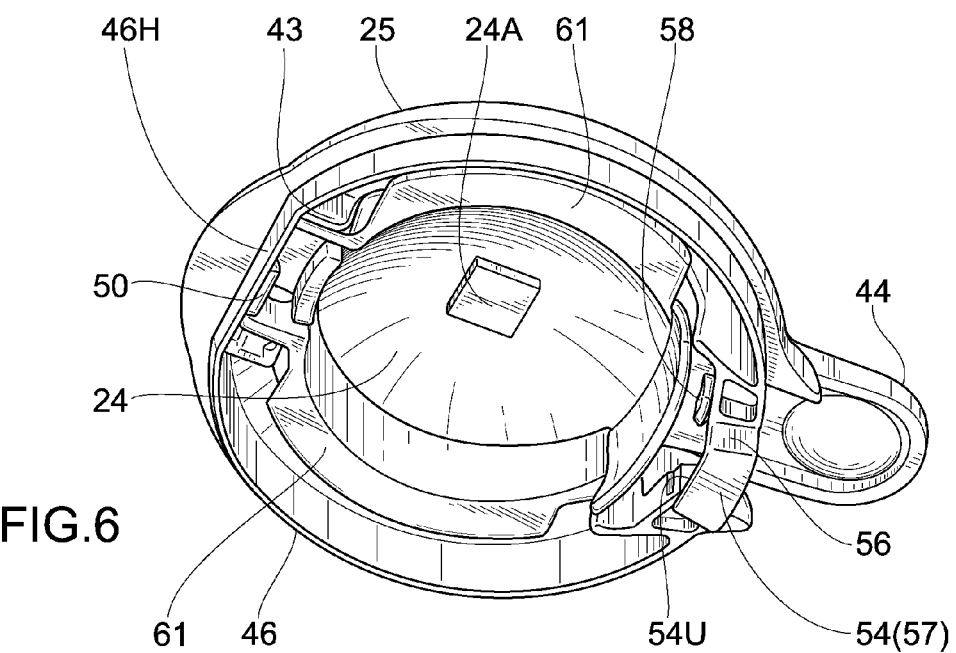
FIG. 6 is a first perspective view showing the control lever of the first embodiment.
Figure 7:
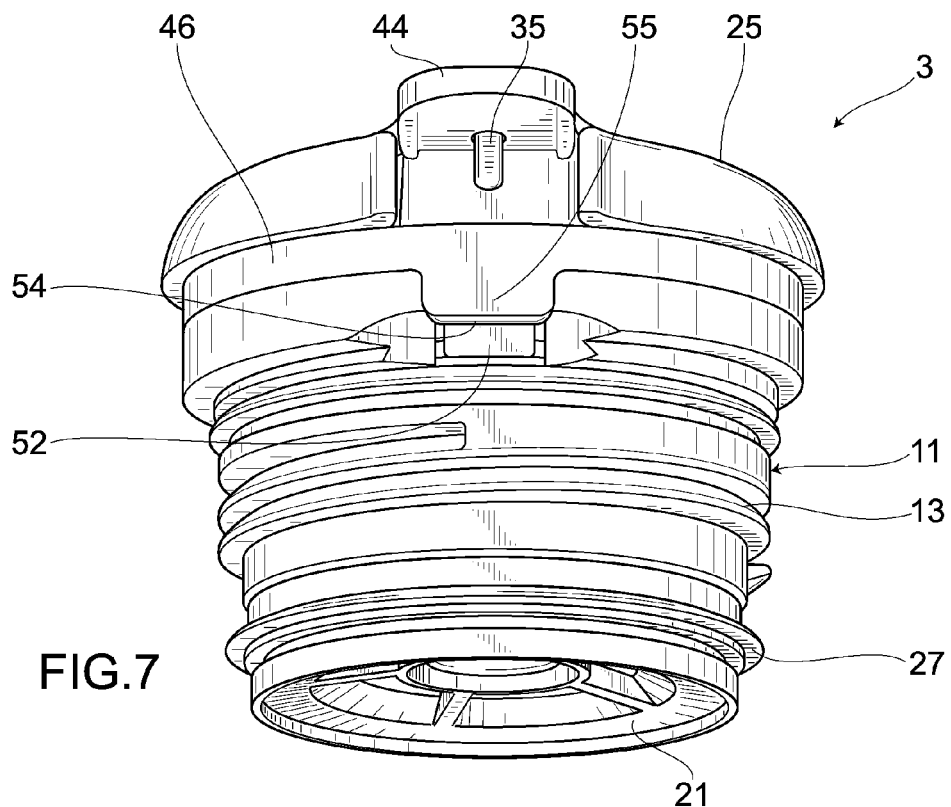
FIG. 7 is a perspective view showing the plug of the first embodiment.
Figure 8:
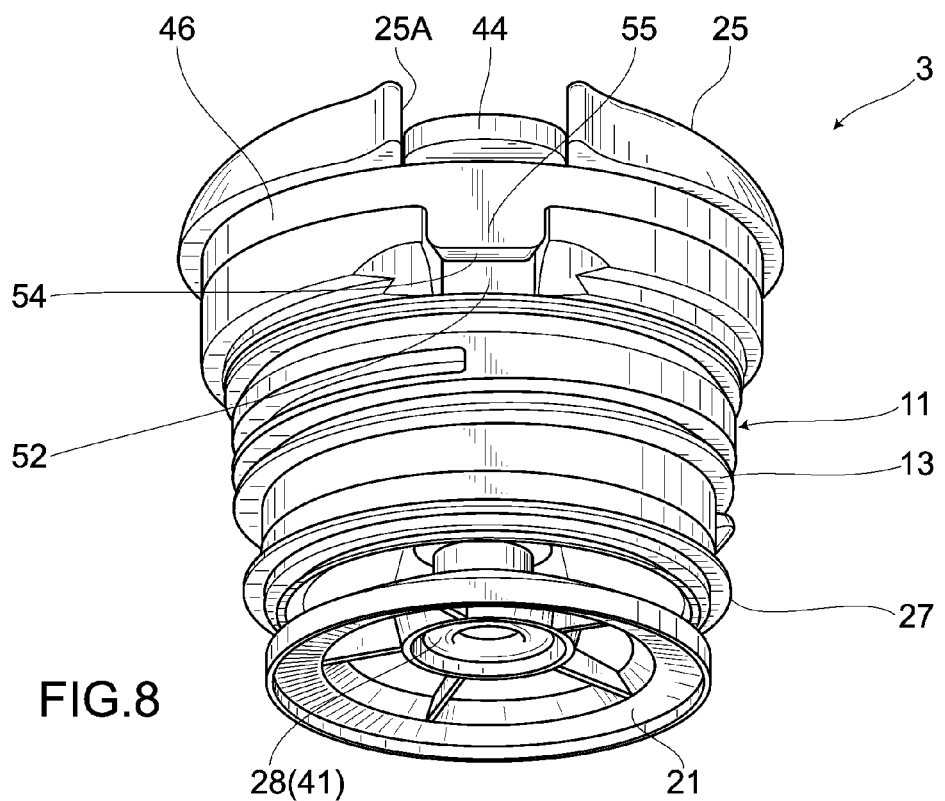
FIG. 8 is a perspective view showing a state of the plug of the first embodiment in which the control lever has been pushed downward.

As shown in FIG. 6, for example, located on the other side of the lower cylindrical portion 46 is a transverse-plate upper surface 54U of a transverse plate section 34, the transverse-plate upper surface 54U serving as a second, engageable portion. The transverse plate section 54 and a lower end of the lower cylindrical portion 46 are connected to each other through an extended portion 35 extended from the corresponding lower cylindrical portion 46. Further, a left and right sides of the transverse plate section 54 are connected to the cover 25 through joining sections 56, 56, the transverse plate section 54 having a flat undersurface.

Provided on the undersurface of the control lever 24 is a protrusion section 58 protruding downward. Particularly, while one side of the protrusion section 58 has a vertical edge portion 59, the other side thereof is formed as slanted edge. That is, the protrusion section 58 is substantially formed into the shape of a triangle in a lateral view. Here, the vertical edge portion 59 is provided with an abutment edge section. 59A formed on a lower portion thereof and slanting from top down to the other side. Further, the abutment edge section 59A is arranged in a location allowing the protrusion section 58 to abut against the elastic section 52 when manipulating the control lever 24.

When rotating the control Sever 24 downward, the abutment edge section 59A shall abut against the central slanted surface 53A, thereby pushing the elastic section 52 in a disengagement direction thereof such that the corresponding elastic section 52 can be disengaged from the transverse-plate upper surface 54U.

Figure 2:
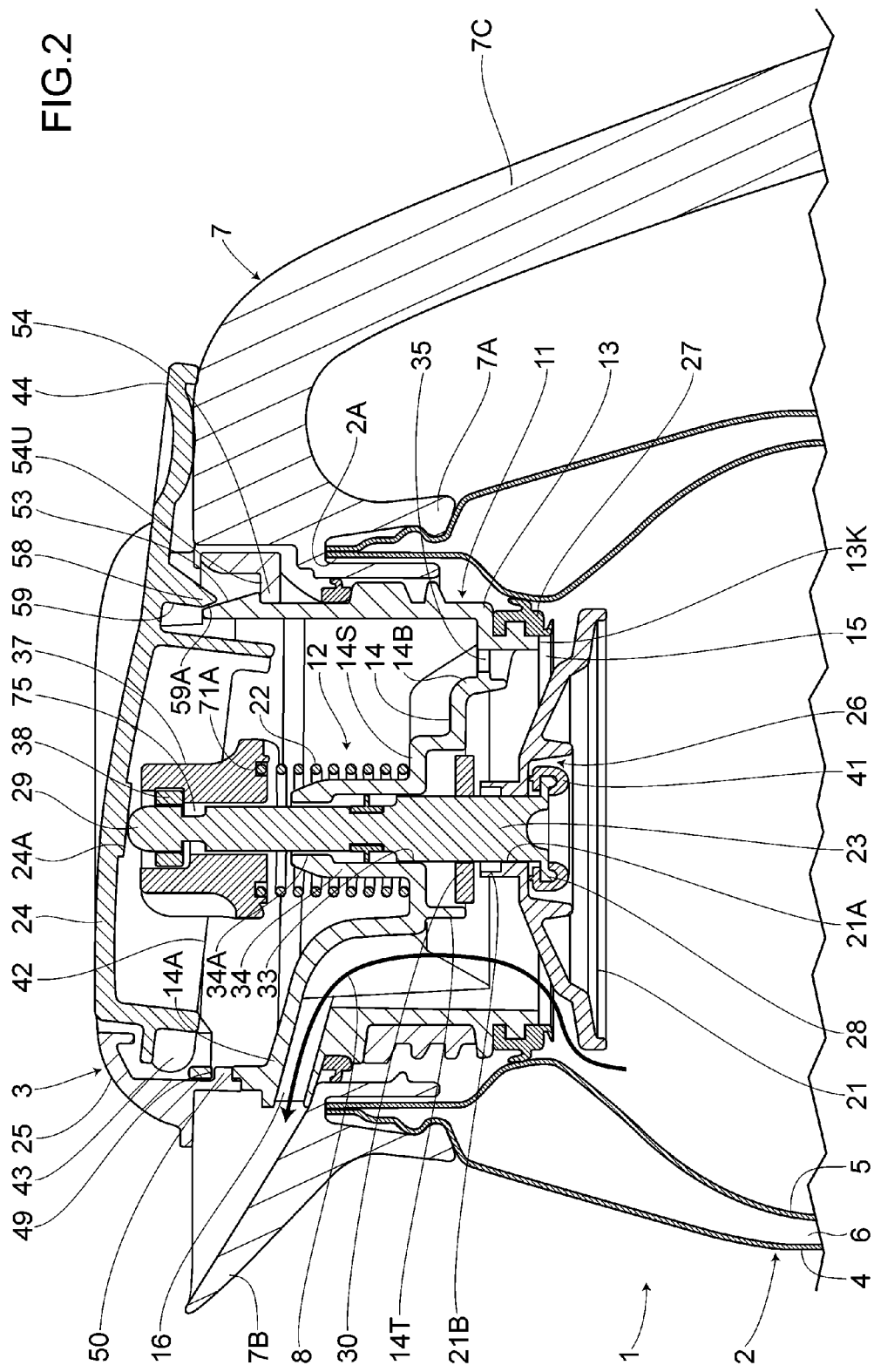
FIG. 2 is an overall cross-sectional view showing a state of the first embodiment in which a control lever is abutting against a shoulder member.

As shown in FIG. 2, with the plug 3 being attached to the container main body 2, a lower section of the control portion 44 shall abut against an upper surface of the shoulder member 7 serving as a rotation restriction member, as a result of pushing the corresponding control portion 44 of the control lever 24 downward. Here, a rotation range of the control lever 24 is thus restricted, thereby preventing the aforementioned protrusion section 58 from abutting against the elastic section 52.

Further, as shown in FIG. 10, for example, flange portions 61, 61 serving as positioning portions are provided on a left and right sides of an under portion of the control, lever 24. Furthermore, provided on the aforementioned, cover 25 is an abutment segment 62 allowing the flange portions 61, 61 to abut there against. Here, upper surfaces of the cover 25 and the control lever 24 shall be substantially flush with each other as a result of allowing the flange portions 61, 61 to abut against the abutment segment 62.

The aforementioned valve body cover 37 includes: a cylindrical portion 71 allowing the shaft portion 29 of the valve pole 23 to be loosely inserted therethrough; a holder 71A that is provided on a lower portion of the cylindrical portion 71 and serves to hold the upper portion of the elastic member 22; finger grips 72, 72 provided on a left and right sides of the cylindrical portion 71; and engagement opening sections 72A, 72A that are respectively provided on the left and right finger grips 72, 72 and allow the aforementioned rotatable part 38 to rotatably engage therewith. Here, the rotatable part 38 is rotatably attached to the engagement opening sections 72A, 72A by being engaged therewith. Each engagement opening section 72A is substantially formed, into the shape of a rectangle, and has an upper and lower edges 72F, 72F that serve to sandwich an upper and under surfaces of the rotatable part 38. Particularly, these upper and lower edges 72F, 72F are arranged parallel to each other in a substantially parallel direction. As for each finger grip 72, a lower portion 72S thereof is widened outward such that it becomes easier to push the valve body cover 37 downward by holding the left and right finger grips 72, 72. Further, the rotatable part 38 is arranged upon an upper portion, of the cylindrical portion 71. That is, with the shaft portion 29 being inserted through the rotatable part 38 and the cylindrical portion 71, a left and right sides of the corresponding rotatable part 38 are engaged with the engagement opening sections 72A, 72A, thereby allowing this rotatable part 38 to be rotatably attached to the valve body cover 37 and move up and down along with the valve body cover 37 in the axial direction.

As for the rotatable part 38, provided on an inner surface of a cylindrical main body 38 H are bulging engagement claw portions 73 serving as engagement portions. Particularly, these engagement claw portions 73 are formed in two locations that are opposite to each other. More particularly each engagement claw portion 73 includes: a vertical edge section 73T extending in the axial direction of the shaft portion 29; a transverse edge section 73Y that is formed on a lower end of the vertical edge section 73T and is thus extended from one end to other end in a direction orthogonal to that of the vertical edge section 73T; and a slanted edge section 73K formed between an upper end of the vertical edge section 73T and other end of the transverse edge section 73Y.

Meanwhile, provided on an upper end section of the shaft portion 29 of the valve pole 23 are claw guiding grooves 74, 74 that are formed in the axial direction and correspond to the aforementioned engagement claw portions 73, 73. Further, provided below adjacent claw guiding grooves 74, 74 is a circumferentially recessed groove 75 allowing the engagement claw portions 73, 73 to engage therewith and the rotatable part 38 to rotate there around. As for each claw guiding groove 74, an upper end thereof located at the upper end section of the shaft portion 29 is opened, thereby allowing each engagement claw portion 73 to be inserted into the corresponding claw guiding groove 74 from the axial direction. Also, with regard to each claw guiding groove 74, a distance between a first side surface 74A and a second side surface 74B is farmed slightly wider than each transverse edge section 73Y. That is, such first side surface 74A and second side surface 74B are respectively formed on a first side and a second side of the shaft portion 29 in a circumferential direction. In fact, the number of the claw guiding grooves 74 provided may be as same as or an integral multiple of the number of the engagement claw portions 73 provided.

Described hereunder is a structure of the recessed groove 75. In the following description, a front end section of the shaft portion 29 is referred to as an upper region, whereas a base end section thereof is referred to as a lower region. The recessed groove 75 includes a first lower slanted surface 76 that: is formed below one of the claw guiding grooves 74 provided as a pair; and allows one of the engagement claw portions 73 to move toward the first side in the circumferential direction. Particularly, a first side of the first lower slanted surface 76 is formed lower than a second side thereof. More particularly, such first side and second side of the first lower slanted surface 76 are substantially arranged in lower sections of virtual extended lines extending from the first side surface 74A and the second side surface 74B. Further, provided next to the first side (lower end) of the first lower slanted surface 76 is a horizontal first bottom surface 77 allowing one of the transverse edge sections 73Y to engage therewith. Furthermore, disposed on a first side of the first bottom surface 77 is a first upper guiding surface 78 that, is formed along the axial direction and extended upward. Furthermore, formed above the first bottom surface 77 is a first upper slanted surface 79 allowing one of the slanted edge sections 73K to abut there against and one of the engagement claw portions 73 to thus move to the first side in the circumferential direction. Here, a first side of the first, upper slanted surface 79 is formed higher than a second side thereof. Such first side and second side of the first upper slanted surface 79 are substantially arranged in upper sections of virtual extended lines extending from the first upper guiding surface 78 and a second side of the first bottom surface 77. Moreover, each slanted edge section 73K and the first upper slanted surface 79 are substantially slanted at a same angle with respect, to the axial direction.

Also, with regard to the recessed groove 75, formed on the first side of the first upper slanted surface 79 is a first upper guiding surface 80 extended upward. This first upper guiding surface 80 is substantially arranged on the virtual extended line extending from the first upper guiding surface 78. Provided on a first side of the first upper guiding surface 80 is an intermediate slanted surface 81 slanting upward toward a first side thereof. Further, provided on the first side of the intermediate slanted surface 81 is a lower guiding surface 82 extended downward. Here, formed on a first side of the first upper guiding surface 78 are a second lower slanted surface 76A and a second bottom surface 77A that are continuous with each other and correspond to the intermediate slanted surface 81. Particularly, the second lower slanted surface 76A is slanted downward from an upper end of the first upper guiding surface 78 to the first side in the circumferential direction. More particularly, the lower guiding surface 82 is formed in a location corresponding to a range that is defined by the second bottom surface 774. In addition, a second upper guiding surface 78A is provided on a first side of the second bottom surface 774. The second side surface 74B of the other claw guiding groove 74 is substantially arranged on a virtual extended line extending from the second, upper guiding surface 78A. A second upper slanted surface 79A is then located between a lower end of the corresponding second side surface 74B and a lower end of the lower guiding surface 82.

Figure 17:
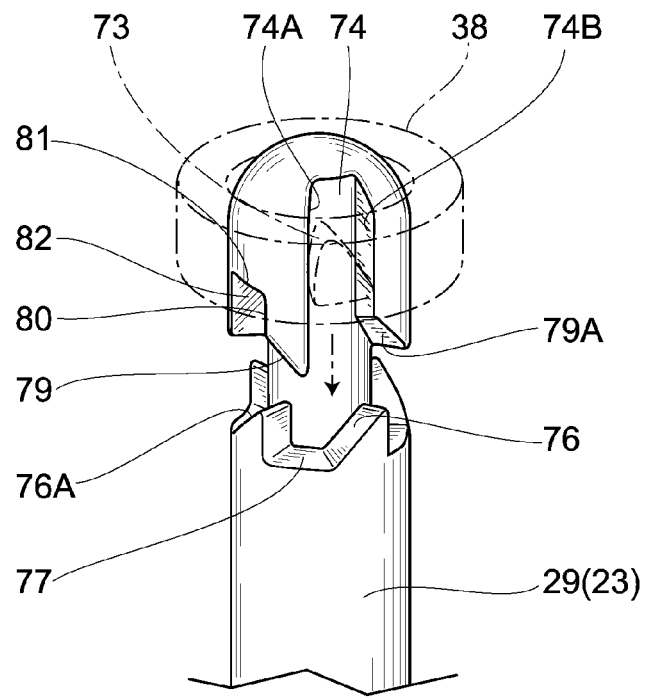
FIG. 17 is a perspective view showing a state of the upper end side of the valve pole and the rotatable part of the first embodiment, in which the rotatable part is being pushed downward with engagement claw portions being positioned to claw guiding grooves.
Figure 18:
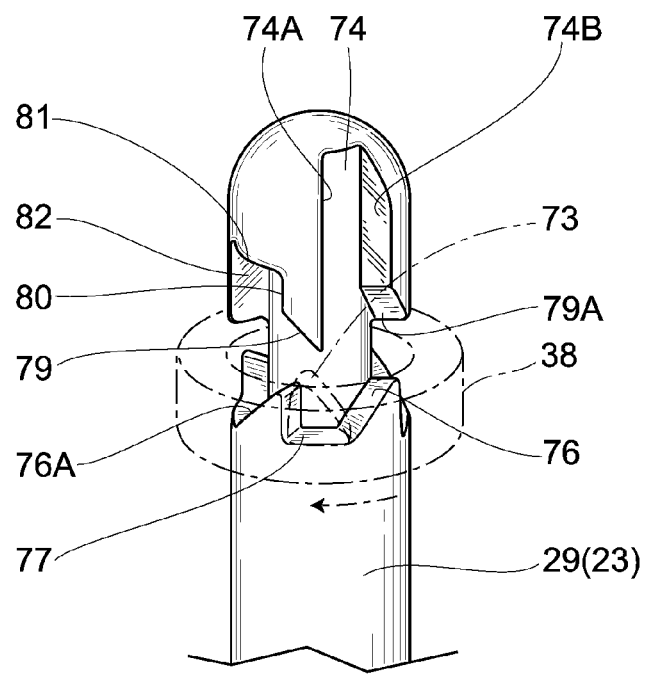
FIG. 18 is a perspective view showing a state of the upper end side of the valve pole and the rotatable part of the first embodiment, in which one of the engagement claw portions has been engaged with a first bottom surface.
Figure 19:
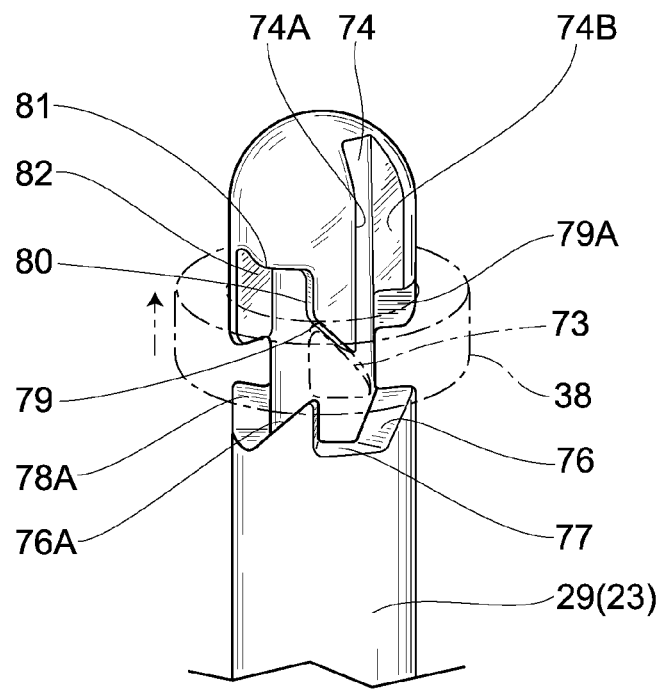
FIG. 19 is a perspective view showing a state of the upper end side of the valve pole and the rotatable part of the first embodiment, in which the aforementioned engagement claw portion has been engaged with a first upper slanted surface.
Figure 20:
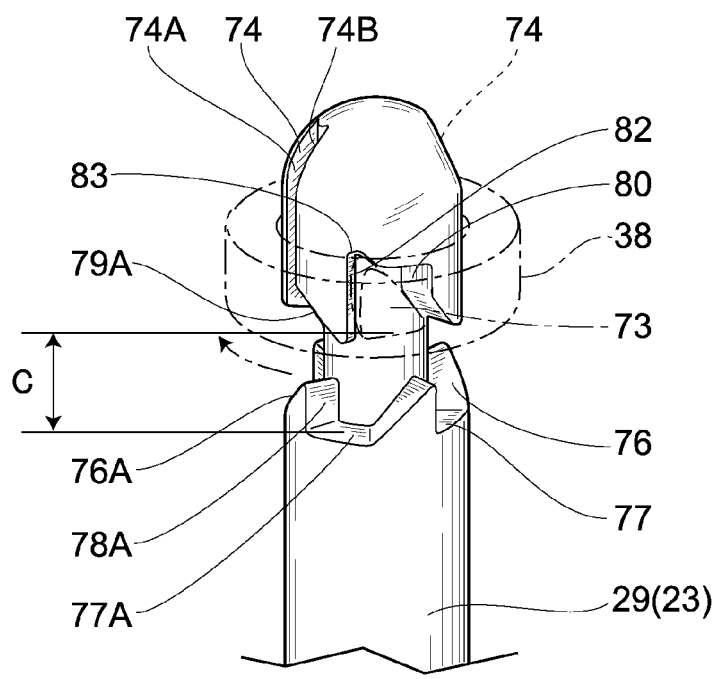
FIG. 20 is a perspective view showing a state of the upper end side of the valve pole and the rotatable part of the first embodiment, in which the aforementioned engagement claw portion has been engaged with a corner section.
Figure 21:
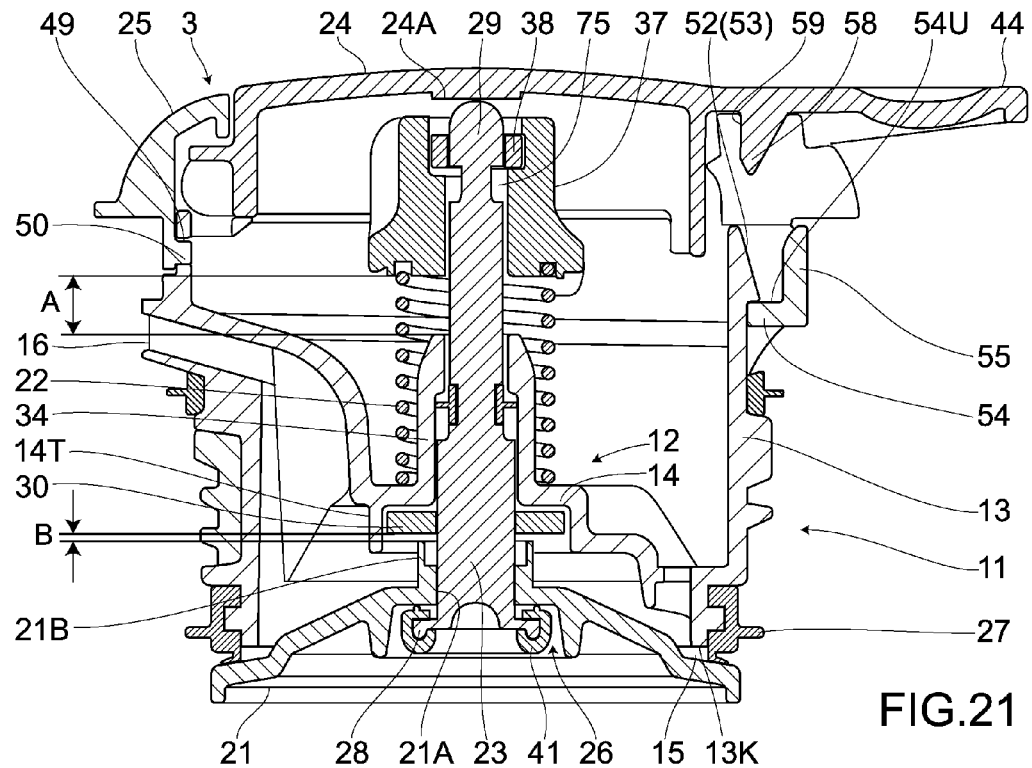
FIG. 21 is a cross-sectional view showing the valve body of the first embodiment.

A method for using the valve body cover 37 is described hereunder with reference to FIG. 17 through FIG. 20 among which the rotatable part 38 is indicated by dashed-dotted lines. As shown in FIG. 17, the engagement claw portions 73, 73 are to be positioned to the claw guiding grooves 74, 74, followed by holding the valve body cover 37 and then pushing the same downward, against a bias of the elastic member 22. As a result, one of the engagement claw portions 73 is to be guided by the first lower slanted surface 76, as shown in FIG. 18, such that the rotatable part 38 can be rotated toward the first side in the circumferential direction, thereby allowing the transverse edge section 73Y of the corresponding engagement claw portion 73 to engage with the first bottom surface 77. Here, by either loosening a force used to push the valve body cover 37 downward or removing a hand, the valve body cover 37 shall rise due to an elastic restoring force of the elastic member 22. As a result, the rotatable part 38 is to be rotated to the first side in the circumferential direction such that the slanted, edge section 73K of the aforementioned engagement claw portion 73 can abut against the intermediate slanted surface 81. Particularly, the valve body cover 37 stops rising when the corresponding engagement claw portion 73 has engaged with a corner section 83 formed by the intermediate slanted surface 81 and the lower guiding surface 82. In this way, the valve body cover 37 is allowed to be attached to the shaft portion 29.

In fact, due to the bias of the elastic member 22, the valve body cover 37 shall not be disengaged from the shaft portion 29 unless when being pushed downward. Further, while an upper end of the shaft portion 29 protruding from an upper end of the valve body cover 37 is in contact with the control lever 24, the valve body cover 37 itself is not. Therefore, the valve body cover 37 shall not be subjected to influences resulting from manipulating the control lever 24.

In contrast, the valve body cover 37 is removed as follows. That is, the valve body cover 37 disposed in an attachment location is to be pushed downward, thereby causing the rotatable part 38 to rotate toward the first side in the circumferential direction, such that a lower portion of the aforementioned engagement claw portion 73 can engage with the second lower slanted surface 76A and that the corresponding engagement claw portion 73 can then engage with the second bottom surface 77A. Here, by either loosening the force used to push the valve body cover 37 downward or removing the hand, the valve body cover 37 shall rise due to the elastic restoring force of the elastic member 22. As a result, the rotatable part 38 is to be rotated to the first side in the circumferential direction such that the slanted edge section 73K of the corresponding engagement claw portion 73 can engage with the second upper slanted surface 79A. In tins way, this engagement claw portion 73 can then rise along a neighboring claw guiding groove 74, thus allowing the valve body cover 37 to be removed from the shaft portion 29.

The present embodiment includes the following structure that allows the valve body cover 37 to be removed from the shaft, portion 29 when pushed downward. A stroke A of the valve body cover 37 is a distance between; a lower end of the valve body cover 37 attached to the shaft portion 29; and an upper end of the guiding cylinder 34. Further, a stroke B of the valve body 21 and the engagement plate 30 is a distance between: an upper end of the cylindrical receiving portion 21B of the closed valve body 21; and the undersurface of the engagement plate 30. Furthermore, a stroke C of one of the engagement claw portions 73 in the attachment location is a distance between: the transverse edge section 73Y of this engagement claw portion 73; and the second bottom surface 77A, in the corner section 83.

The distances A, B and C stratify a formula of A>(B−C). Therefore, when removing the valve body cover 37 from the valve pole 23, the plug main body 11 and the valve body cover 37 can be prevented from abutting against each other, thus preventing the rotatable part 38 from failing to rotate to a disengagement location.

Described hereunder is a function of the aforementioned structure. When assembling the plug 3, the transverse protruding portion 50 is to be inserted into and engaged with the transverse hole 49 on one side. Next, the other side of the cover 25 is to be pushed downward, centering around where the transverse protruding portion 50 is engaged with the transverse hole 49. As a result, the transverse plate section 54 shall abut against an outer surface of the engagement claw section 53, thereby causing the elastic section 52 to undergo an elastic deformation inward, thus allowing the transverse plate section 54 to engage with the engagement claw section 53. In this way, the cover 25 is allowed to be fixed to the plug main body it.

Alternatively a slanted surfaces) may be provided on a lower portion of the transverse protruding portion 50. In such case, since the protrusion section 48 is also elastic, the cover 25 can be fixed to the ping main body 11 when, simply pushed down thereto from above.

Here, the control portion 44 of the control lever 24 can be pushed downward with the plug 3 being screwed together with the container main body 2. At that time, the control lever 24 is allowed to pivot around the pivot point 43 that is provided on one end. Particularly, the convex portion 24A of the control lever 24 pushes the upper end of the valve pole 23 downward as the control lever 24 itself pivots, thus causing both the valve pole 23 and the valve body 21 to move downward against the bias of the elastic member 22. As a result, the water-stop packing 27 shall move away from, the valve body 21 such that the fluid passage 8 shall be opened. Here, by titling the beverage container 1 toward the direction of the spout portion 7B, the content fluid can be poured out through the fluid passage 8 and the spout portion 7B. Further, as for the control lever 24, the lower section of the control portion 44 cart abut against the upper surface of the shoulder member 7 serving as a rotation restriction member. There, the control lever 24 can be restricted from further rotating with the transverse plate section 54 being engaged with and held by the elastic section 52, thus defining a rotation, restriction position.

Figure 22:
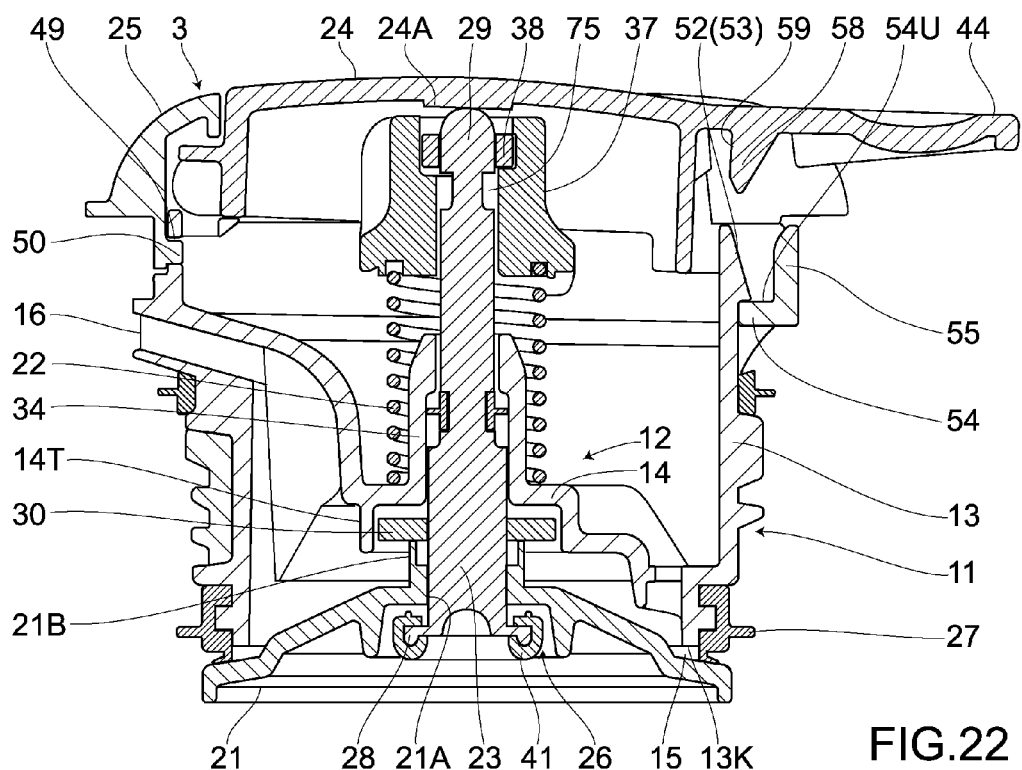
FIG. 22 is a cross-sectional view showing a state of the valve body of the first embodiment in which a pressure reducing unit has been opened.
Figure 23:
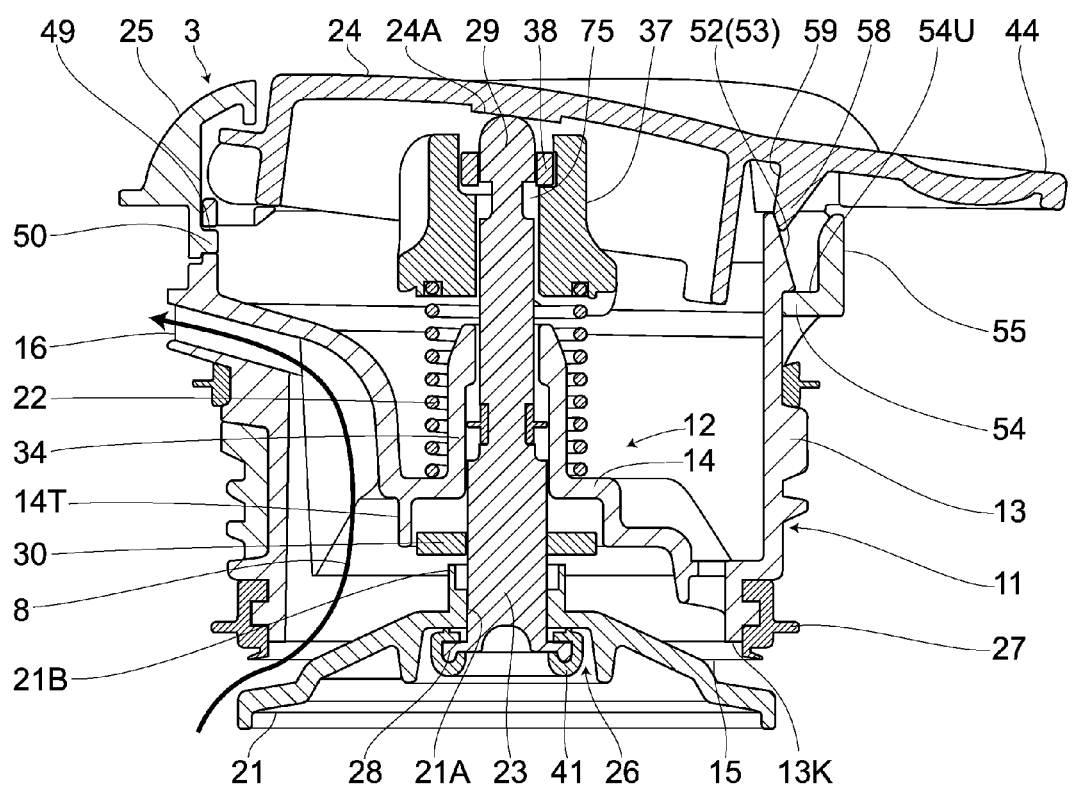
FIG. 23 is a cross-sectional view showing an opened state of the valve body of the first embodiment.

When the container main body 2 contains hot water or a hot beverage, a pressure inside such container main body 2 may increase due to water vapor. In such case, as shown in FIG. 22, by rotating the control lever 24, the pressure reducing packing 41 of a smaller area shall move away from the undersurface of the valve body 21 as the valve pole 23 descends, with the water-stop packing 27 being pressed onto the valve body 21 due to the pressure inside the container. Thus, the pressure inside the container main body 2 can be released. Here, since the vertical ventilation grooves 31T are circumferentially formed on the lower section 29S of the shaft portion 29, the pressure inside the container main body 2 can be smoothly released from between the attachment hole 21A and the ventilation grooves 31T. As a result of releasing the pressure inside the container main body 2, a pressurized holding force for holding the valve body 21 upward shall vanish, thereby causing the corresponding valve body 21 to descend due to gravity, thus, as shown in FIG. 23, allowing an opened state of the valve body 21 to be established.

Further, even when the container main body 2 contains hot water or a hot beverage, the pressure inside the container main body 2 may reduce, if leaving the beverage container 1 as it is after releasing the pressure inside the container main body 2 through discharge. Here, if a pressure reducing force is greater than the elastic restoring force of the elastic member 22, the valve pole 23 shall automatically descend, thereby causing the pressure reducing packing 41 to move away from the undersurface of the valve body 21, thus allowing the pressure inside the container main body 2 to be released, thereby causing the corresponding pressure to become an atmospheric level.

Figure 4:
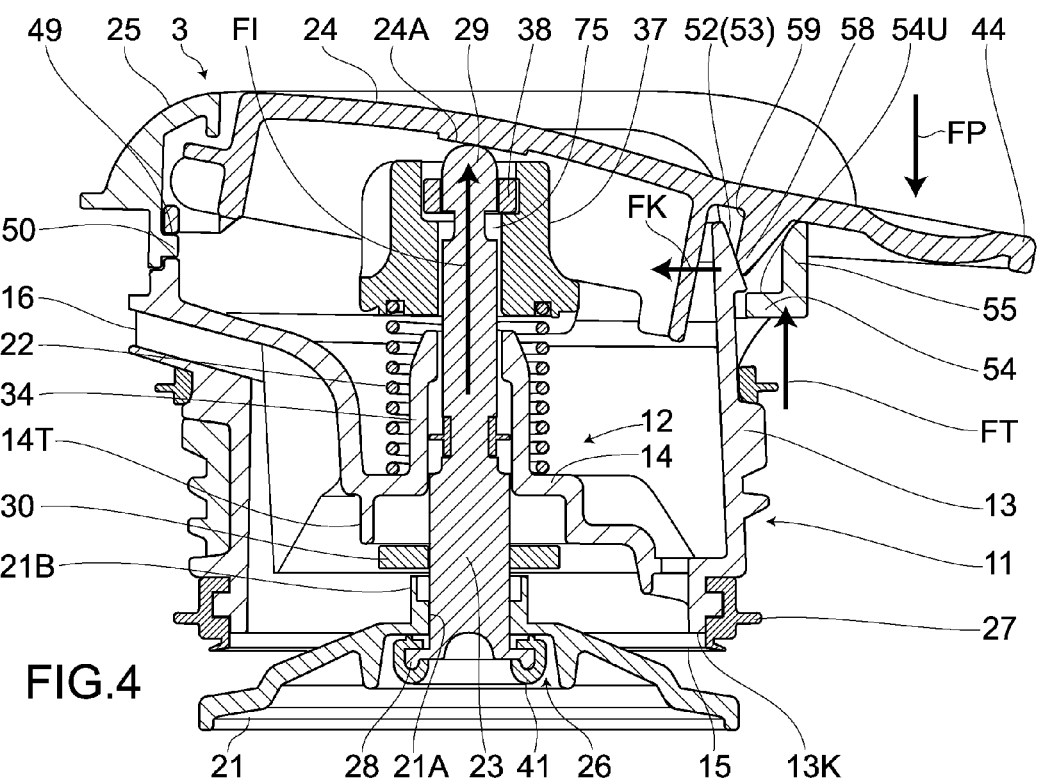
FIG. 4 is a cross-sectional view showing a state of a plug of the first embodiment in which a second engagement portion and a second engageable portion have been disengaged from each other through a protrusion section.

FIG. 4 shows the plug 3 that has been removed from the container main body 2. The engagement claw section 53 can still be engaged with the transverse-plate upper surface 54U, even after rotating the control lever 24 to the rotation restriction position that is defined when the plug 3 is attached to the container main body 2. Here, by further pushing the control portion 44 downward and then beyond the rotation restriction position, the abutment edge section 59A of the protrusion section 58 shall abut against the outer surface of the elastic section 52. There, as shown, in FIG. 4, by further pushing the control lever 24 downward, the elastic section 52 shall, undergo an elastic deformation, inward due to the protrusion section 58, thus causing the engagement claw section. 53 to disengage from the transverse-plate upper surface 54U.

Once the engagement claw section 53 has been disengaged from the transverse-plate upper surface 54U, the valve pole 23 shall push the control lever 24 upward due to the elastic member 22, thereby causing the corresponding control lever 24 to rotate upward, thus allowing the other side of the cover 25 to disengage from the plug main body 11.

After removing the cover 25 from the plug main body 11, the valve body cover 37 can then be removed from the upper portion of the valve pole 23, thereby allowing the valve pole 23, the elastic member 22, the valve body 21 and the engagement plate 30 to be further removed from the plug main body 11, thus making it possible to wash the fluid passage 8 and the valve structure 12 of the plug main body 11 separately.

The valve structure 12 thus washed can then be reattached to the plug main body 11 as follows. That is, the engagement plate 30 is to be attached to die shaft portion 29 of the valve pole 23, followed by successively; inserting such shaft portion 29 through the attachment hole 21A of the valve body 21, the through hole 33 and the guiding cylinder 34; fitting the elastic member 22 onto the guiding cylinder 34; placing the valve body cover 37 on top of the elastic member 22; and then engaging the upper section 29U of the shaft portion 29 with the valve body cover 37.

As described in the present embodiment, by simply pushing the control lever 24 downward, the protrusion section 58 provided thereon shall push the elastic section 52 of the plug main body 11 in an disengagement direction FK, thus allowing the cover 25 and the plug main body 11 to disengage from each other.

At that time, since the valve pole 23 of the valve body 21 is biased in a direction allowing the inlet 15 of the fluid passage 8 to be closed, not only the cover 25 and the plug main body 11 can disengage from each other, but a force enabling disengagement from the plug main body 11 is generated in a disengagement direction FI and is then applied to the control lever 24 and the cover 25. That is, an easy disassembly is possible by manipulating the control lever 24.

Further, although the valve body 21 can be either opened or closed by manipulating the control lever 24 with the plug 3 being attached to the container main body 2, the protrusion section 58 of the control lever 24 is allowed to stop short of disengaging the elastic section 52 at the rotation restriction position where the control lever 24 abuts against the shoulder member 7, thus preventing the plug main body H and the cover 25 from disengaging from each other due to an erroneous manipulation.

Furthermore, since the elastic section 52 is arranged on an inner side of a largest outer diameter of the plug main body 11, and since the protrusion section 58 can enter an inner side of the cover 25 when pushing the control lever 24 downward, the protrusion section 58 can be hidden inside the cover 25, thus not only improving an outer appearance, but also avoiding, from the perspective of safety, a contact with the protrusion section 58 when manipulating the control lever 24. Moreover, the transverse plate section 54 is disposed on a lower region of the cover 25. Therefore, the control lever 24 and such transverse plate section 54 are to be squeezed against each other when performing disengagement. Thus, a force FP for pushing the control lever 24 and forces FT for pinching the cover 25 shall cancel each other out such that only a force for closing the valve body 21 shall be applied to the control lever 24 and the cover 25. For this reason, the plug main body 11 and the cover 25 can be easily disassembled from each other.

As set forth in claim 1, the present embodiment is a plug of a fluid container. Specifically, formed inside the plug main body 11 that is detachably attached to the upper opening section 2A of the container main body 2, is the fluid passage 8 connecting the inlet 15 and the outlet 16, the inlet 15 and the outlet 16 being respectively opened toward an inner side and an outer side of the container main body 2. Also provided inside the plug main body 13 is the valve body 21 biased in the direction allowing the inlet 15 of the fluid passage 8 to be closed. The cover 25 for closing the upper opening section 42 is disposed on an upper end of the plug main, body 11. Further, provided on such cover 25 is the control lever 24 capable of being pushed downward and used to either open or close the valve body 21. While the transverse hole 49 serving as the first engagement portion is provided on either one of the plug main body 11 and the cover 25, the protruding portion 50 serving as the first engageable portion that is engageable with the first engagement portion is provided on the other. Here, the elastic section 52 is formed on the upper portion of the plug main body 11. Particularly, while the engagement claw section 53 serving as the second, engagement portion is provided on either one of the elastic section 52 of the plug main body 11 and the cover 25, the transverse-plate upper surface 54U serving as the second engageable portion that is engageable with the second engagement portion is provided on the other. The control lever 24 includes the protrusion section 58 capable of; abutting against the elastic section 52 as the result of pushing the control lever 24 downward; and then pushing such elastic section 52 in the disengagement direction. That is, by pushing the control lever 24 downward, the protrusion section 58 thereof shall push the elastic section 52 of the plug main body 11 in the disengagement direction, thus allowing the engagement, claw section 53 to disengage from the transverse-plate upper surface 54U. At that time, since the control lever 24 is biased upward by the valve body 21, the cover 25 can be easily removed from the plug main body 11.

Here, a guiding slanted surface(s) may be formed on the lower portion of the protruding portion 50. In such case, since the protrusion section 48 having the transverse hole 49 is elastic, the cover 25 can be substantially simultaneously engaged with and fixed to a front and rear sections of the plug main, body 11 by simply pressing the cover 25 against the plug main body 11 from above.

Further, as set forth in claim 2, the present embodiment allows the valve body 21 to be either opened or closed, by pushing the control lever 24 downward with the plug main, body 11 being attached to the container main body 2. However, since the control portion 44 of the control lever 24 shall abut against the shoulder member 7, the protrusion section 58 is allowed to stop short of disengaging the elastic section 52. That is, while the valve body 21 can be opened by pushing the control lever 24 at an initial position downward through the control portion 44, it can be closed by releasing such control, lever 24. Specifically, the valve body 21 closes as the control lever 24 returns to its initial position due to the valve body 21 itself that is biased upward. In addition, the control portion 44 shall abut against the shoulder member 7 even when pushing the control lever 24 downward with the plug main body 11 being attached to the container main body 2, thus preventing the engagement claw section 53 and the transverse-plate upper surface 54U from being disengaged from each other. Namely, the disengagement of the cover 25 shall not occur even when pushing the control lever 24 at the point of use.

Furthermore, as set forth in claim 3, the elastic section 52 of the present embodiment is arranged on the inner side of the outermost diameter, i.e., largest outer diameter of the plug main body 11. Therefore, the protrusion section 58 can enter the inner side of the cover 25 when pushing the control, lever 24 downward, thus improving the outer appearance as well as a design property at the point of use.

The effects of the present embodiment are as follows. That is, the protruding portion 50 of the cover 25 that protrudes toward the other side is to be engaged with the transverse hole 49 formed on one side of the plug main body 11, from one side of such transverse hole 49. For this reason, the plug main body 11 and the cover 25 can easily engage with each other on the other side as a result of pushing the other side of such cover 25 downward while employing an engagement point of the protruding portion 50 and the transverse hole 49 as a pivot point. Further, since the transverse hole 49 is formed in a transverse direction, and since the protruding portion 50 that is also formed in the transverse direction is to be engaged with such transverse hole 49, a stable rotation becomes possible while employing the aforementioned engagement point as a rotation pivot point. Furthermore, the vertical edge portion 59 is provided on one side of the protrusion section 58. Particularly, the vertical edge portion 59 is provided in the location allowing the protrusion section 58 to engage with the elastic section 52 when manipulating the control lever 24. More particularly, provided on the lower portion of the vertical edge portion 59 is the abutment edge section 59A slanting from top down to the other side. Here, the central slanted surface 53A is formed on the other side of the engagement claw section 53. Accordingly, the abutment edge section 59A can abut against such central slanted surface 53A as the protrusion section 58 descends, thereby allowing the elastic section 52 to be elastically deformed toward one side, thus resulting in a smooth disengagement on the other side.

In addition, the valve body 21 and the valve pole 23 are independent from each other. Particularly, the valve body 21 for closing the inlet 15 of the fluid passage 8 is disposed on the valve pole 23, the fluid passage 8 reaching an upper region of the valve body 21. More particularly, a diameter of the valve pole 23 is formed smaller than that of the valve body 21. For these reasons, even when the inner pressure of the container main body 2 is high due to hot water or the like, this inner pressure can be released by first pushing the disk portion 28 of the valve pole 23 downward. That is, there can be avoided a situation where the valve body 21 fails to be pushed downward due to the inner pressure, and the content fluid can thus be reliably discharged. Here, since the ventilation grooves 31T are formed on the valve pole 23, clearances can then be formed with, respect to the attachment hole 21A of the valve body 21, thus making it possible to reliably discharge the inner pressure. After releasing the inner pressure in such manner, the pressurized holding force for holding the valve body 21 upward shall vanish, thereby causing the corresponding valve body 21 to descend due to gravity, thus allowing the opened state of the valve body 21 to be established. In contrast, when the pressure inside the container main body 2 has been reduced, the valve pole 23 shall automatically descend if the pressure reducing force is greater than the elastic restoring force of the elastic member 22 at that time. There, the descent of the valve pole 23 shall allow the pressure reducing packing 41 to move away from the undersurface of the valve body 21, thus allowing the pressure inside the container main body 2 to be released to the atmospheric level.

The present invention is not limited to the present embodiment. In fact, various modified embodiments are possible within the scope of the present invention. For example, although the aforementioned embodiment employs the type of valve pole that can ascent and descent with respect to the valve body, this valve pole may actually be integrally disposed on the valve body. Further, the plug of the present invention is not limited to that used in a thermos bottle. As a matter of fact, the plug of the present invention can also be used in a water flask or the like. Here, the container main body may be made of glass, a synthetic resin or the like. However, the container main body does not need to have a heat-insulated structure.

What is claimed:

1. A plug for use in a beverage container having a container main body, comprising:
    a plug main body detachably attached to an opening section of said container main body;
    a fluid passage formed inside said plug main body, and extending from an inlet open toward an inner side of said container main body to an outlet open toward an outer side of said plug main body;
    a valve body biased in a direction allowing the inlet of said fluid passage to be closed;
    a cover that is provided on an upper end of said plug main body and serves to cover an upper opening section of said plug main body;
    a control lever that is provided on said cover and is capable of being pushed downward such that said valve body can be opened and closed;
    an elastic section provided on an upper portion of said plug main body, the elastic section serving to engage and disengage said cover; and
    a protrusion section that is provided on an underneath surface of said control lever, and is capable of abutting against and moving said elastic section in a disengagement direction from the cover when pushing said control lever downward.

2. The plug for use in a beverage container according to claim 1, wherein while said control lever serves to open and close said valve body when pushed downward with said plug main body being attached to said container main body, said protrusion section is allowed to stop short of disengaging said elastic section as a control portion of said control lever abuts against a shoulder member provided on said beverage container.

3. The plug for use in a beverage container according to claim 2, wherein said elastic section is arranged on an inner side of an outermost diameter of said plug main body such that said protrusion section can enter an inner side of said cover when pushing said control lever downward.

4. The plug for use in a beverage container according to claim 2, wherein said disengagement direction is a direction pointing toward an inner side of said plug main body.

5. The plug for use in a beverage container according to claim 2, wherein a vertical edge portion is formed on one side of said protrusion section, said vertical edge portion being arranged in a location allowing said protrusion section to abut against said elastic section when manipulating said control lever.

6. The plug for use in a beverage container according to claim 5, wherein an abutment edge section slanting from top down to an other side is formed on a lower portion of said vertical edge portion, and a central slanted surface slanting from top down to said other side is formed on another side of said elastic section.

7. The plug for use in a beverage container according to claim 1, wherein said elastic section is arranged on an inner side of an outermost diameter of said plug main body such that said protrusion section can enter an inner side of said cover when pushing said control lever downward.

8. The plug for use in a beverage container according to claim 1, wherein said disengagement direction is a direction pointing toward an inner side of said plug main body.

9. The plug for use in a beverage container according to claim 1, wherein a vertical edge portion is formed on one side of said protrusion section, said vertical edge portion being arranged in a location allowing said protrusion section to abut against said elastic section when manipulating said control lever.

10. The plug for use in a beverage container according to claim 9, wherein an abutment edge section slanting from top down to an other side is formed on a lower portion of said vertical edge portion, and a central slanted surface slanting from top down to said other side is formed on another side of said elastic section.

11. The plug for use in a beverage container according to claim 1, further comprising:
    a first engagement portion provided on one of said plug main body and said cover; and
    a first engageable portion that is provided on the other of said plug main body and said cover and is engageable with said first engagement portion.

12. The plug for use in a beverage container according to claim 11, wherein said first engagement portion is a transverse hole provided on one side of said plug main body, and said first engageable portion is a protruding portion that is provided on one side of said cover and protrudes toward another side, said protruding portion being engaged with said transverse hole from one side of said transverse hole.

13. The plug for use in a beverage container according to claim 11, further comprising:
- a second engagement portion provided on one of said elastic section of said plug main body and said cover;
- a second engageable portion that is provided on the other of said elastic section of said plug main body and said cover and is engageable with said second engagement portion.

14. A plug for use in a beverage container having a container main body, comprising:
- a plug main body detachably attached to an opening section of said container main body;
- a fluid passage formed inside said plug main body, and extending from an inlet open toward an inner side of said container main body to an outlet open toward an outer side of said plug main body;
- a valve body biased in a direction allowing the inlet of said fluid passage to be closed;
- a cover that is provided on an upper end of said plug main body and serves to cover an upper opening section of said plug main body;
- a control lever that is provided on said cover and is capable of being pushed downward such that said valve body can be opened and closed;
- a first engagement portion provided on one of said plug main body and said cover;
- a first engageable portion that is provided on the other of said plug main body and said cover and is engageable with said first engagement portion;
- an elastic section provided on an upper portion of said plug main body, the elastic section serving to engage and disengage said cover; and
- a protrusion section that is provided on an underneath surface of said control lever and is capable of abutting against and moving said elastic section in a disengagement direction from the cover when pushing said control lever downward.

15. The plug for use in a beverage container according to claim 14, further comprising:
- a second engagement portion provided on one of said elastic section of said plug main body and said cover; and
- a second engageable portion that is provided on the other of said elastic section of said plug main body and said cover and is engageable with said second engagement portion.

16. A beverage container system, comprising:
- a beverage container having a container main body; and
- a plug for use with the beverage container, the plug having:
  - a plug main body detachably attached to an opening section of said container main body;
  - a fluid passage formed inside said plug main body, and extending from an inlet open toward an inner side of said container main body to an outlet open toward an outer side of said plug main body;
  - a valve body biased in a direction allowing the inlet of said fluid passage to be closed;
  - a cover that is provided on an upper end of said plug main body and serves to cover an upper opening section of said plug main body;
  - a control lever that is provided on said cover and is capable of being pushed downward such that said valve body can be opened and closed;
  - a first engagement portion provided on one of said plug main body and said cover;
  - a first engageable portion that is provided on the other of said plug main body and said cover and is engageable with said first engagement portion;
  - an elastic section provided on an upper portion of said plug main body;
  - a second engagement portion provided on one of said elastic section of said plug main body and said cover;
  - a second engageable portion that is provided on the other of said elastic section of said plug main body and said cover and is engageable with said second engagement portion; and, a protrusion section that is provided on said control lever, and is capable of abutting against and moving said elastic section in a disengagement direction when pushing said control lever downward.

17. The beverage container system of claim 16, wherein said elastic section is arranged on an inner side of an outermost diameter of said plug main body such that said protrusion section can enter an inner side of said cover when pushing said control lever downward.

18. The beverage container system of claim 16, wherein said disengagement direction is a direction pointing toward an inner side of said plug main body.

* * * * *